(12) United States Patent
Moon et al.

(10) Patent No.: US 11,024,186 B2
(45) Date of Patent: Jun. 1, 2021

(54) UNMANNED AERIAL VEHICLE

(71) Applicant: Korea Aerospace Research Institute, Daejeon (KR)

(72) Inventors: Sang Man Moon, Daejeon (KR); In Kyu Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 1032 days.

(21) Appl. No.: 15/343,192

(22) Filed: Nov. 3, 2016

(65) Prior Publication Data
US 2017/0132943 A1    May 11, 2017

(30) Foreign Application Priority Data

Nov. 10, 2015   (KR) .......................... 10-2015-0157051

(51) Int. Cl.
*G08G 5/04* (2006.01)
*B64C 39/02* (2006.01)
(Continued)

(52) U.S. Cl.
CPC ........... *G08G 5/045* (2013.01); *B64C 39/024* (2013.01); *B64D 45/0059* (2019.08);
(Continued)

(58) Field of Classification Search
CPC ......... H04W 4/02; H04W 4/029; H04W 4/00; H04W 4/024; H04W 4/30; H04W 4/40; H04W 4/42; H04W 4/44; H04W 4/46; H04W 4/48; H04W 4/80; G08G 5/04; G08G 5/0021; G08G 5/0069; G08G 5/0078; G08G 5/0008; G08G 5/0039; G08G 5/045; G08G 5/00; G08G 7/00; G08G 5/0004; G08G 5/0017; G08G 5/0047; G08G 5/02; G08G 5/025; G08G 1/00; G08G 1/166; G08G 1/161; B64C 39/02; B64C 39/024; B64C 2201/141; B64D 2045/0045; B64D 2045/0085; B64D 45/0059; G05D 1/00; G05D 1/04; G01P 13/00; G01P 15/00; G01C 21/00; G01C 21/005; G01C 21/12; G01C 21/16; G01C 21/26; G01C 21/34;
(Continued)

(56) References Cited

U.S. PATENT DOCUMENTS 7,379,796 B2 * 5/2008 Walsdorf ............... B64D 45/04
 244/180
7,469,183 B2 * 12/2008 Bodin .................. G05D 1/0027
 701/23

(Continued)

*Primary Examiner* — Anthony R Jimenez
(74) *Attorney, Agent, or Firm* — Westerman, Hattori, Daniels & Adrian, LLP

(57) ABSTRACT

Provided is an unmanned aerial vehicle that broadcasts a route and future location information of the unmanned aerial vehicle within preset coverage based on sensing data and current location information of the unmanned aerial vehicle. The unmanned aerial vehicle includes a calculator configured to calculate a predicted route and second location information of the unmanned aerial vehicle corresponding to a preset period of time based on first location information and sensing data; and a transmitter configured to periodically broadcast a first notification signal that includes the first location information, the predicted route, and the second location information.

14 Claims, 7 Drawing Sheets

(51) Int. Cl.
*G08G 5/00* (2006.01)
*H04W 4/029* (2018.01)
*B64D 45/00* (2006.01)

(52) U.S. Cl.
CPC ......... *G08G 5/0008* (2013.01); *G08G 5/0021* (2013.01); *G08G 5/0039* (2013.01); *G08G 5/0069* (2013.01); *G08G 5/0078* (2013.01); *H04W 4/029* (2018.02); *B64C 2201/141* (2013.01); *B64D 2045/0085* (2013.01)

(58) Field of Classification Search
CPC .............. G01C 21/36; B60W 2550/00; B60W 2550/20; B60W 2550/30; B60W 2550/302; B60W 2550/304; B60W 2550/306; B60W 2550/308; B60W 2550/40; B60W 2550/402; B60W 2550/406; B60W 2550/408; B60W 50/0097

USPC ........................................................... 701/5
See application file for complete search history.

(56) References Cited

U.S. PATENT DOCUMENTS

| | | | | |
|---|---|---|---|---|
| 8,315,756 | B2* | 11/2012 | Caveney | G08G 1/167 701/23 |
| 8,744,737 | B2* | 6/2014 | D'Angelo | G08G 5/0008 701/120 |
| 10,279,906 | B2* | 5/2019 | Levien | B64C 39/024 |
| 2015/0364046 | A1* | 12/2015 | Lissajoux | G08G 5/0047 701/3 |
| 2016/0140851 | A1* | 5/2016 | Levy | G08G 5/0069 701/3 |
| 2016/0285863 | A1* | 9/2016 | Canavor | H04L 63/123 |
| 2017/0069214 | A1* | 3/2017 | Dupray | G08G 5/0021 |
| 2018/0157255 | A1* | 6/2018 | Halverson | B64C 39/024 |

* cited by examiner

UNMANNED AERIAL VEHICLE

CROSS-REFERENCE TO RELATED APPLICATION(S)

This application claims the priority benefit of Korean Patent Application No. 10-2015-0157051 filed on Nov. 10, 2015, in the Korean Intellectual Property Office, the disclosure of which is incorporated herein by reference for all purposes.

BACKGROUND

1. Field

One or more example embodiments relate to an unmanned aerial vehicle, and more particularly, to an unmanned aerial vehicle that may transmit a specific signal within preset coverage.

2. Description of Related Art

In the recent times, the use of an unmanned aerial vehicle, such as a drone, a helicopter, etc., enabling flying or navigation according to induction of radio waves is increasing. Here, with an increase in the use of the unmanned aerial vehicle, a desire for a collision prevention apparatus and method for preventing a negligent accident in a flight area is also increasing.

In a manned flight field according to the related art, an apparatus for transmitting and receiving an interrogator pulse using a transponder is being used. Thus, pilots may identify a corresponding flying object, thereby preventing a mid-air collision and guiding a safe landing. However, in the case of controlling an unmanned aerial vehicle that flies at a relatively high altitude and operates in an invisible area, a pilot or a user may not readily intervene in the control. Accordingly, there is a need for the development of an unmanned aerial vehicle that may automatically perform safe flight even in an invisible area.

SUMMARY

According to an aspect, there is provided an unmanned aerial vehicle configured to broadcast a predicted route and future location information of the unmanned aerial vehicle within preset coverage based on sensing data and current location information of the unmanned aerial vehicle. The unmanned aerial vehicle includes a calculator configured to calculate a first predicted route and second location information of the unmanned aerial vehicle corresponding to a preset period of time based on first location information and sensing data; and a transmitter configured to periodically broadcast a first notification signal that includes the first location information, the first predicted route, and the second location information.

The transmitter may be further configured to periodically broadcast the first notification signal that further includes a message requesting a second predicted route of another unmanned aerial vehicle.

The unmanned aerial vehicle may further include a receiver configured to receive a second notification signal that includes a second predicted route and third location information associated with another unmanned aerial vehicle from the other unmanned aerial vehicle. The calculator may be further configured to calculate a collision probability between the unmanned aerial vehicle and the other unmanned aerial vehicle based on the sensing data, the second location information, and the third location information. Also, the unmanned aerial vehicle may further include a controller configured to change a route of the unmanned aerial vehicle in response to the collision probability calculated at the calculator being greater than or equal to a threshold.

The calculator may be further configured to use, as the sensing data, first acceleration data and first angular speed data on a plane corresponding to a heading direction of the unmanned aerial vehicle and second acceleration data and second angular speed data of a vertical direction of the plane.

According to another aspect of an example embodiment, there is provided an unmanned aerial vehicle configured to recognize that a flying state of the unmanned aerial vehicle is in an emergency state in response to a difference between predicted location information of the unmanned aerial vehicle and an actual flight location being greater than or equal to a threshold. The unmanned aerial vehicle includes a sensor device configured to measure first sensing data corresponding to a heading direction of the unmanned aerial vehicle; a calculator configured to calculate a predicted route and first predicted location information of the unmanned aerial vehicle corresponding to a preset period of time based on first current location information and the first sensing data; and a transmitter configured to calculate a difference value between second current location information after the preset period of time and the first predicted location information, and to periodically broadcast a first danger signal in response to the difference value being greater than or equal to a threshold.

The sensor device may be further configured to measure first acceleration data and first angular speed data on a plane corresponding to a heading direction of the unmanned aerial vehicle and second acceleration data and second angular speed data of a vertical direction of the plane.

The transmitter may be further configured to periodically broadcast the first danger signal in response to the first predicted location information being outside preset altitude coverage.

The unmanned aerial vehicle may further include a receiver configured to receive a second danger signal associated with another unmanned aerial vehicle from the other unmanned aerial vehicle. The transmitter may be further configured to transmit a first notification signal for requesting a route and second predicted location information corresponding to a preset period of time to the other unmanned aerial vehicle.

The unmanned aerial vehicle may further include a controller configured to change a route of the unmanned aerial vehicle based on the second predicted location information included in a response signal, in response to the receiver receiving the response signal corresponding to the first notification signal.

According to still another aspect of an example embodiment, there is provided a non-transitory computer-readable recording medium storing a program to periodically transmit a notification signal that includes a route and location information of an unmanned aerial vehicle. The program includes a set of instructions configured to calculate a route and second location information corresponding to a preset period of time based on first location information and sensing data; and a set of instructions configured to periodically broadcast a first notification signal that includes the first location information, the route, and the second location information.

According to still another aspect of an example embodiment, there is provided a non-transitory computer-readable recording medium storing a program to determine an emergency state of an unmanned aerial vehicle and to periodically transmit a danger signal associated with the emergency state. The program includes a set of instructions configured to measure first sensing data corresponding to a heading direction of the unmanned aerial vehicle; a set of instructions configured to calculate a route and first predicted location information of the unmanned aerial vehicle corresponding to a preset period of time based on first current location information and the first sensing data; and a set of instructions configured to calculate a difference value between second current location information after the preset period of time and the first predicted location information, and to periodically broadcast a first danger signal in response to the difference value being greater than or equal to a threshold.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
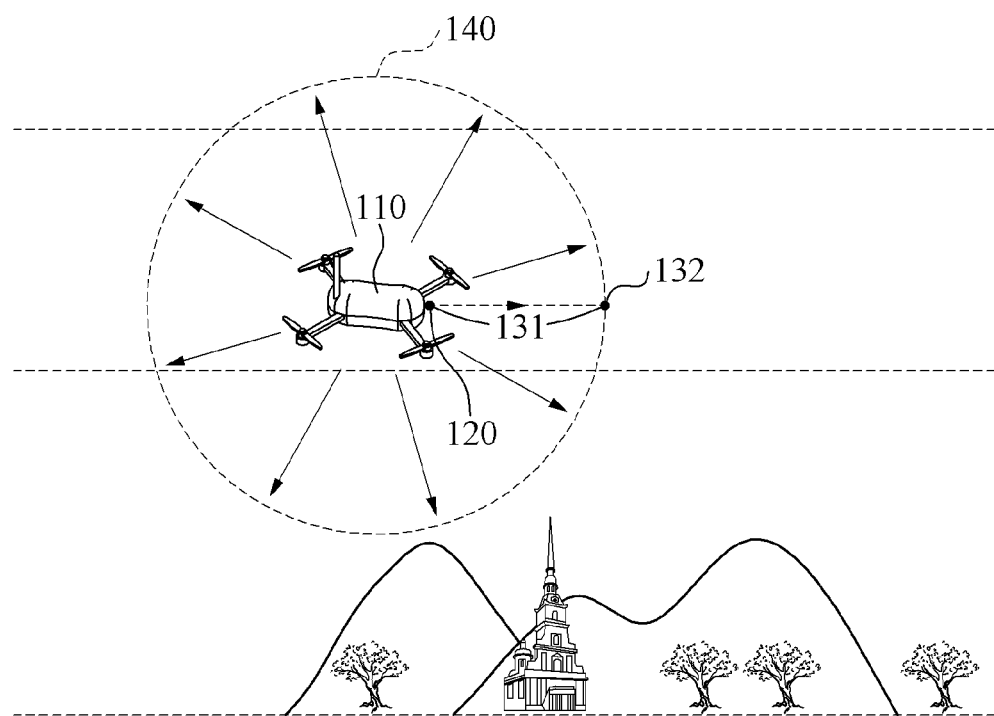
FIG. 1 illustrates an example of describing an operation of an unmanned aerial vehicle according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 illustrates an example of describing an operation of an unmanned aerial vehicle according to an example embodiment. FIG. 1 illustrates an unmanned aerial vehicle 110 that is flying. Herein, the unmanned aerial vehicle 110 refers to a flying object that is steered through a remote control source without a pilot onboard, and may include embodiments configured in a variety of forms, such as a drone, a helicopter, etc.

The unmanned aerial vehicle 110 may acquire current location information 120 of the unmanned aerial vehicle 110. For example, the unmanned aerial vehicle 110 may receive the current location information 120 from a global positioning system (GPS) satellite. In addition, the unmanned aerial vehicle 110 may calculate a predicted route 131 and future location information 132 of the unmanned aerial vehicle 110 corresponding to a preset period of time based on sensing data. In more detail, the unmanned aerial vehicle 110 may acquire the sensing data using an inertial sensor. The inertial sensor indicates a sensor configured to detect a variety of navigation information, such as an acceleration, a speed, a heading direction, and a travel distance of the unmanned aerial vehicle 110. For example, an Attitude Heading Reference System (AHRS) may be employed.

The unmanned aerial vehicle 110 may encode the current location information 120, and the calculated predicted route 131 and future location information 132, and may periodically broadcast an encoded signal within preset coverage 140. For example, the present coverage 140 may be calculated based on the altitude of the unmanned aerial vehicle 110 and the speed of the unmanned aerial vehicle 110 according to the altitude. For example, the speed of the unmanned aerial vehicle 110 according to the altitude may indicate a speed limit determined based on a mandatory regulation.

Also, a flying object that flies around the unmanned aerial vehicle 110 may receive a signal periodically broadcasted from the unmanned aerial vehicle 110, may decode the received signal, and may acquire current location information, a predicted route, and future location information of the unmanned aerial vehicle 110. In addition, since the flying object may change its flight plan based on the acquired information, it is possible to prevent a collision between flying objects and to achieve further enhanced stability.

Figure 2A:
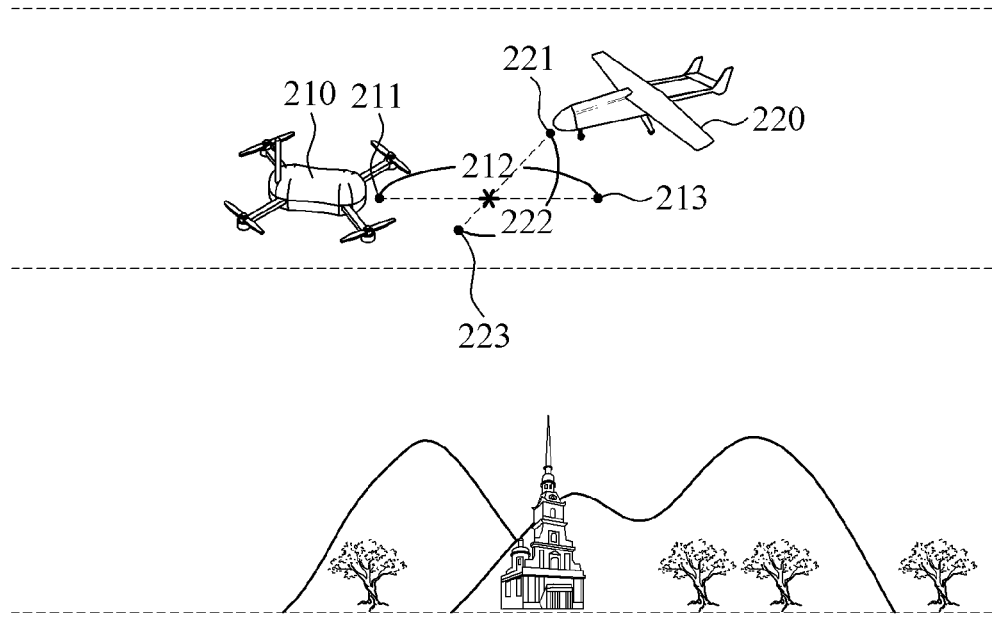
FIGS. 2A and 2B illustrate another example of describing an operation of an unmanned aerial vehicle according to an example embodiment.
Figure 2B:
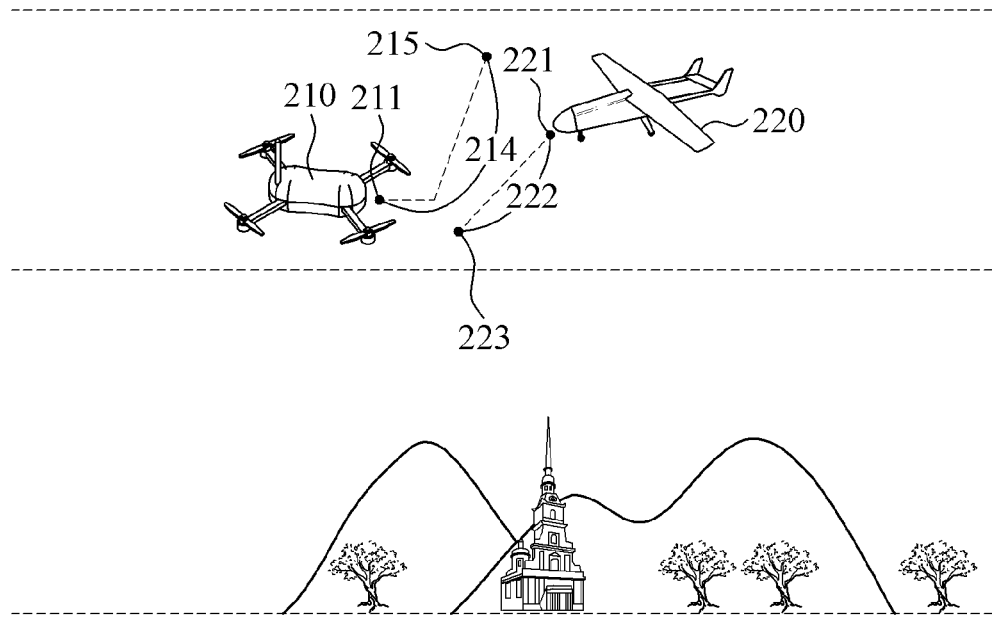

FIGS. 2A and 2B illustrate another example of describing an operation of an unmanned aerial vehicle according to an example embodiment. FIG. 2A illustrates a first unmanned aerial vehicle 210 and a second unmanned aerial vehicle 220 that are flying at the same flying altitude. The first unmanned aerial vehicle 210 may periodically broadcast a first notification signal that includes current location information 211 acquired using GPS navigation information, a predicted route 212, and future location information 213. Similarly, the second unmanned aerial vehicle 220 may also periodically broadcast a second notification signal that includes current location information 221, a predicted route 222, and future location information 223 of the second unmanned aerial vehicle 220.

For example, an operation of the first unmanned aerial vehicle 210 will be described. The first unmanned aerial vehicle 210 may receive the second notification signal transmitted from the second unmanned aerial vehicle 220. The first unmanned aerial vehicle 210 may decode the second notification signal based on a predetermined decoding method. In addition, the first unmanned aerial vehicle 210 may acquire the current location information 221, the predicted route 222, and the future location information 223 of the second unmanned aerial vehicle 220 that are decoded from the second notification signal.

Further, the first unmanned aerial vehicle 210 may compare the predicted route 212 and the future location information 213 of the first unmanned aerial vehicle 210 to the predicted route 222 and the future location information 223 of the second unmanned aerial vehicle 220, and may calculate a collision probability between the first unmanned aerial vehicle 210 and the second unmanned aerial vehicle 220. If the calculated collision probability is less than or equal to a threshold, the first unmanned aerial vehicle 210 may continue a current flight along the currently planned predicted route 212.

FIG. 2B illustrates an example in which a collision probability calculated at the first unmanned aerial vehicle 210 is greater than or equal to a threshold. The first unmanned aerial vehicle 210 may calculate a contact point between the predicted route 212 of the first unmanned aerial vehicle 210 and the predicted route 222 of the second unmanned aerial vehicle 220 within a preset time range. Accordingly, the first unmanned aerial vehicle 210 may modify the planned predicted route 212 and move to another location 215 through another route 214. In detail, the first unmanned aerial vehicle 210 may move to the other location 215 along the other route 214 by modifying at least one of a heading direction, an air speed, and a flying altitude of the first unmanned aerial vehicle 210.

In the example embodiment, the first unmanned aerial vehicle 210 may compare a notification signal received from another unmanned aerial vehicle to a current flight condition of the first unmanned aerial vehicle 210 and may predict a collision probability. Further, if the collision probability is predicted to be greater than or equal to a threshold, the first unmanned aerial vehicle 210 may avoid a collision by detouring a predicted collision point. According to an example embodiment, there may be provided a flight method of a further convenient and safe unmanned aerial vehicle using a configuration in which the unmanned aerial vehicle predicts a collision point autonomously and avoids the predicted collision point without an associated controller or pilot aboard.

Figure 3:
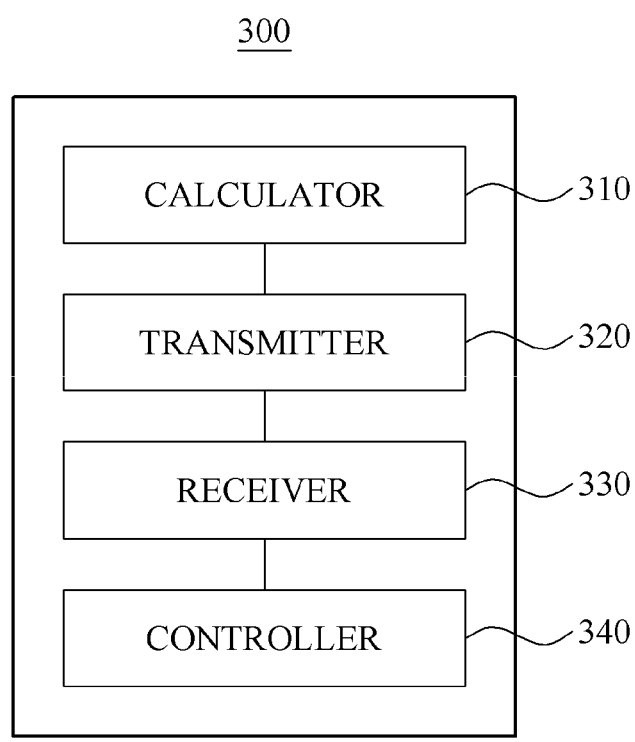
FIG. 3 is a block diagram illustrating an example of an unmanned aerial vehicle according to an example embodiment.

FIG. 3 is a block diagram illustrating an example of an unmanned aerial vehicle according to an example embodiment. Referring to FIG. 3, an unmanned aerial vehicle 300 may include a calculator 310, a transmitter 320, a receiver 330, and a controller 340. The calculator 310 may calculate a predicted route and second location information of the unmanned aerial vehicle 300 corresponding to a preset period of time based on first location information and sensing data. The sensing data may be data measured at an inertial sensor that includes an acceleration sensor or a gyro sensor of the unmanned aerial vehicle 300. In detail, the calculator 310 may use, as the sensing data, first acceleration data and first angular speed data on a plane corresponding to a heading direction of the unmanned aerial vehicle 300 and second acceleration data and second angular speed data of a vertical direction of the plane.

For example, first location information may indicate an initial location of the unmanned aerial vehicle 300. In addition, the second location information may indicate a location of the unmanned aerial vehicle 300 predicted to move from the initial location.

The transmitter 320 may periodically broadcast a first notification signal that includes first location information, a predicted route, and second location information. In detail, a broadcast period of the transmitter 320 and a preset time range of the predicted route calculated at the calculator 310 may be associated with each other. For example, if the transmitter 320 transmits the first notification signal every two seconds, the calculator 310 may calculate a predicted route corresponding to two seconds and second location information after two seconds is elapsed.

In addition, the transmitter 320 may periodically broadcast the first notification signal that further includes a message requesting a route corresponding to the preset period of time. The unmanned aerial vehicle 300 may notify another unmanned aerial vehicle of travel information of the unmanned aerial vehicle 300 corresponding to the preset period of time using the first notification signal and, at the same time, may transmit a message requesting travel information of the other unmanned aerial vehicle.

The receiver 330 may receive, from the other unmanned aerial vehicle, a second notification signal that includes a second predicted route and third location information associated with the other unmanned aerial vehicle.

Herein, the transmitter 320 and the receiver 330 may transmit and receive a notification signal using, for example, a C-band that is a radio waves having the radar frequency amplitude of 4 GHz to 8 GHz. As another example, the transmitter 320 and the receiver 330 may transmit and receive a notification signal using a ultrahigh frequency (UHF) that is a radio wave having the radar frequency amplitude of 300 MHz to 3 GHz).

As another example, the transmitter 320 and the receiver 330 may transmit and receive a notification signal using a wireless Internet interface, such as wireless local area network (WLAN), wireless fidelity (WiFi) direct, digital living network alliance (DLNA), wireless broadband (WiBro), world interoperability for microwave access (WiMAX), high speed downlink packet access (HSDA), and the like, and a near field communication interface, such as Bluetooth™, radio frequency identification (RFID), infrared data association (IrDA), ultra wideband (UWB), ZigBee, near field communication (NFC), and the like.

The calculator 310 may calculate a collision probability with another unmanned aerial vehicle based on the third location information included in the second notification signal received at the receiver 330. In detail, the calculator 310 may calculate a collision probability between the unmanned aerial vehicle 300 and another unmanned aerial vehicle based on sensing data, second location information, and third location information. If the calculated collision probability is greater than or equal to a threshold, the controller 340 may change a route of the unmanned aerial vehicle 300.

The unmanned aerial vehicle 300 may predict the collision probability by transmitting and receiving a predetermined notification signal to and from the other unmanned aerial vehicle, and may avoid a collision by automatically changing a route. Although the unmanned aerial vehicle 300 flies at an altitude corresponding to an invisible area, a user on the ground may receive flight information of the unmanned aerial vehicle 300 that is further safe according to the example embodiments.

Figure 4:
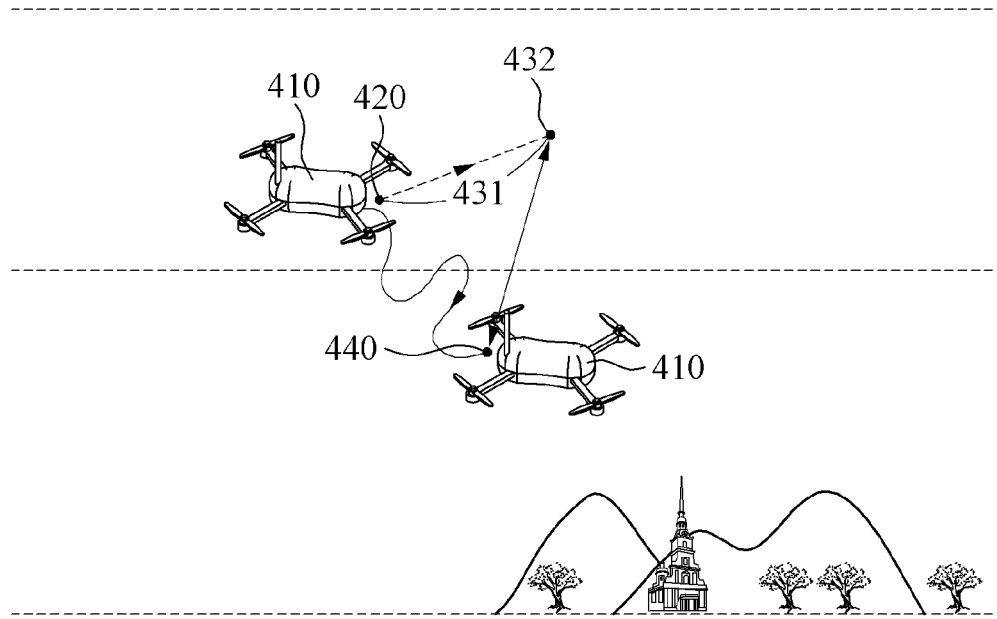
FIG. 4 illustrates another example of describing an operation of an unmanned aerial vehicle according to an example embodiment.

FIG. 4 illustrates another example of describing an operation of an unmanned aerial vehicle according to an example embodiment. FIG. 4 illustrates an unmanned aerial vehicle 410 that is flying. The unmanned aerial vehicle 410 may measure first acceleration data and first angular speed data on a plane corresponding to a heading direction of the unmanned aerial vehicle 410 using an internal sensor. Further, the unmanned aerial vehicle 410 may measure second acceleration data and second angular speed data of a vertical direction of the plane corresponding to the heading direction of the unmanned aerial vehicle 410 using the internal sensor. Using the internal sensor, the unmanned aerial vehicle 410 may acquire 3D spatial travel data on an airway along which the unmanned aerial vehicle 410 flies.

The unmanned aerial vehicle 410 may calculate a predicted route 431 and predicted location information 432 corresponding to a preset period of time based on the measured sensing data and first current location information 420 acquired from GPS information of the unmanned aerial vehicle 410. The description related to the calculator 310 of FIG. 3 may be applicable to the above process and a further description will be omitted here.

Once the preset period of time is elapsed, the unmanned aerial vehicle 410 may compare second current location information 440 acquired from GPS satellite information to the predicted location information 432. If a difference value between the second current location information 440 and the predicted location information 432 is greater than or equal to a threshold, the unmanned aerial vehicle 410 may determine that the unmanned aerial vehicle 410 is in an emergency state. For example, the emergency state of the unmanned aerial vehicle 410 may indicate a state in which the unmanned aerial vehicle 410 deviates from a predicted route, that is, course, corresponding to a control signal and may not maintain a desired altitude, such as a depletion of fuel, a dead battery, a system error, an engine malfunction, and the like.

The unmanned aerial vehicle 410 may periodically broadcast a danger signal indicating an emergency state of the unmanned aerial vehicle 410 within preset coverage. In detail, the danger signal may be used to transfer a message saying "an unmanned aerial vehicle in an emergency state is present ahead so please change a flight path" to another manned aerial vehicle or unmanned aerial vehicle. The unmanned aerial vehicle 410 may compare predicted location information to actual location information, and may autonomously verify whether the unmanned aerial vehicle 410 is in an impossible flight state, and may inform a neighboring flying object(s) of a danger signal associated with the emergency state. Thus, it is possible to prevent a dangerous situation by a collision between flying objects or crash of a flying object.

Figure 5:
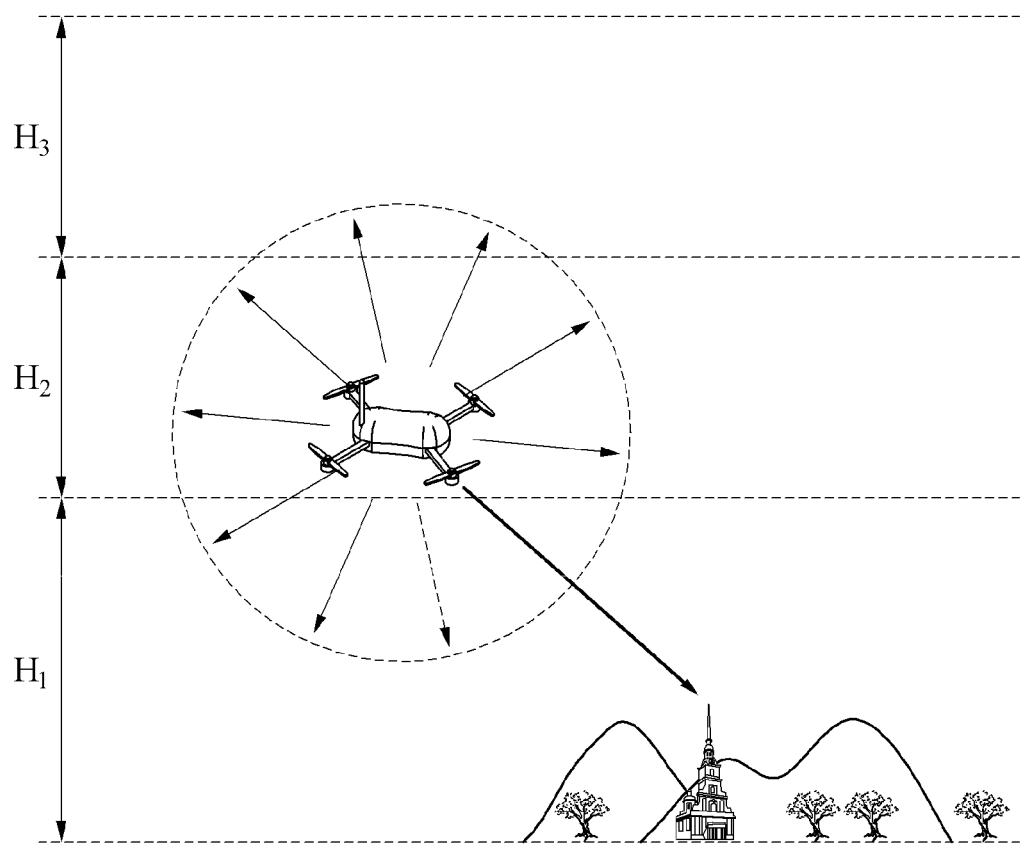
FIG. 5 illustrates another example of describing an operation of an unmanned aerial vehicle according to an example embodiment.

FIG. 5 illustrates another example of describing an operation of an unmanned aerial vehicle according to an example embodiment. FIG. 5 illustrates an unmanned aerial vehicle 510 that is flying, and three flying altitudes, $H_1$, $H_2$, and $H_3$, for unmanned aerial vehicles including the unmanned aerial vehicle 510. The first flying altitude $H_1$ may denote a stage of low speed flight for unmanned aerial vehicles, the second flying altitude $H_2$ may denote a stage of high speed flight for unmanned aerial vehicles, and the third flying altitude $H_3$ may denote a stage of restricted flight for unmanned aerial vehicles. For example, the stage of low speed flight may represent a visible area of a pilot in which an unmanned aerial vehicle for photographing or leisure activities may fly. In addition, the stage of high speed flight may represent an invisible area of a pilot in which an unmanned aerial vehicle for delivery, observation, and monitoring activities may fly. The stage of restricted flight may represent an area in which flight for military purposes or flight of a manned aerial vehicle is prohibited.

Here, the three flying altitudes, $H_1$, $H_2$, and $H_3$, and the description related thereto are proposed only to help the understanding and are not construed as limiting or restricting the right of the present disclosure. Further, it will be apparent to those skilled in the art that the example embodiments may be expanded to example embodiments in which a flying altitude of an unmanned aerial vehicle is further segmented or the meaning thereof is differently applied.

FIG. 5 illustrates an example in which the unmanned aerial vehicle 510 flies at $H_2$ corresponding to the stage of high speed flight. Further, a control device or a user associated with the unmanned aerial vehicle 510 may transmit a command signal to maintain the flying altitude $H_2$ that is the stage of high speed flight to the unmanned aerial vehicle 510 according to a mandatory control.

As described above, in an emergency situation, such as a depletion of fuel, an engine malfunction, a dead battery, etc., of the unmanned aerial vehicle 510, it may be difficult to maintain the unmanned aerial vehicle 510 at $H_2$ that is the stage of high speed flight. If predicted location information of the unmanned aerial vehicle 510 deviates from $H_2$ that is the stage of high speed flight, the unmanned aerial vehicle 510 may transmit a danger signal within preset coverage.

For example, the unmanned aerial vehicle 510 may calculate predicted location information of the unmanned aerial vehicle 510 based on z-axial acceleration data and acceleration of gravity. As another example, the unmanned aerial vehicle 510 may calculate predicted location information of the unmanned aerial vehicle 510 by acquiring image data of a heading direction of the unmanned aerial vehicle 510, and by calculating a distance from the ground, such as a ground surface, a building, a tree, etc., based on the image data.

The unmanned aerial vehicle 510 may periodically broadcast a first danger signal including a message saying "it is in an emergency flying state deviated from a designated course, so avoid", within preset coverage. Also, the unmanned aerial vehicle 510 may transmit a second danger signal saying "it is in an emergency flying state deviated from a designated course, so be careful for crash".

The unmanned aerial vehicle 510 may autonomously determine whether the unmanned aerial vehicle 510 deviates from a preset altitude and may transmit a signal corresponding to the determination result to a neighboring unmanned aerial vehicle, a control device, or a user terminal. Accordingly, the user may employ the unmanned aerial vehicle 510 in a safe and lawful manner within legal limits.

Figure 6:
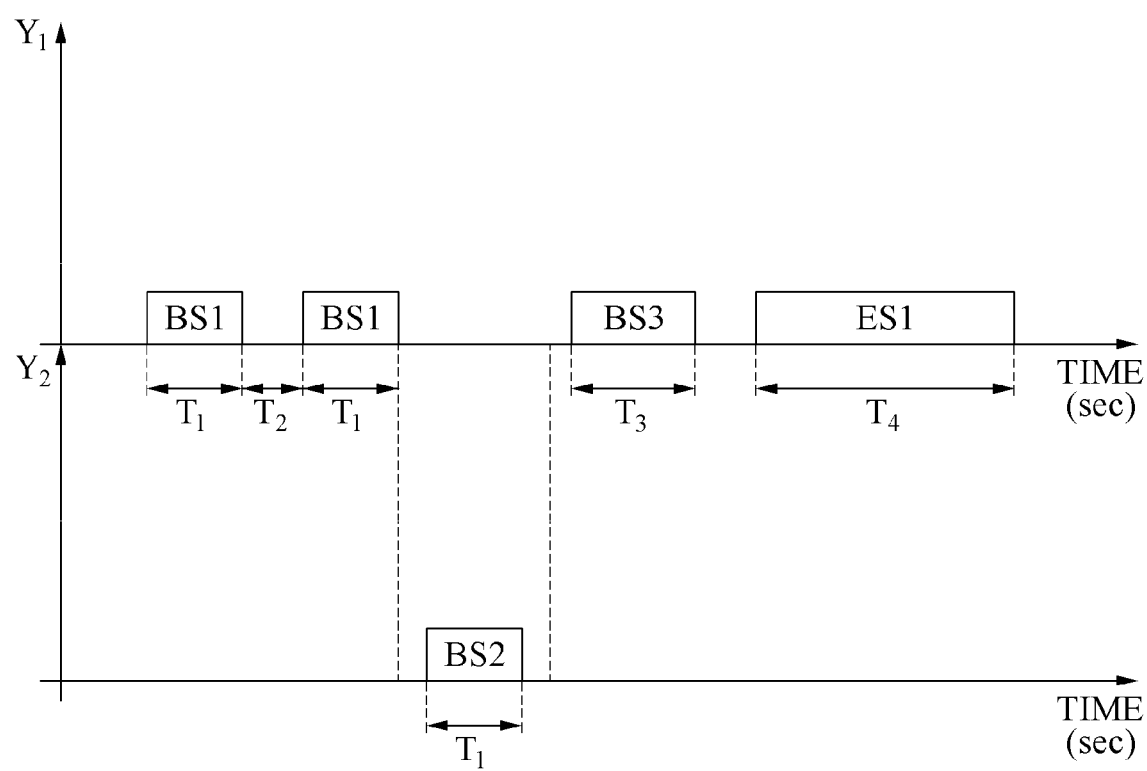
FIG. 6 illustrates an example of a signal transmitted and received at an unmanned aerial vehicle according to an example embodiment.

FIG. 6 illustrates an example of a signal transmitted and received at an unmanned aerial vehicle according to an example embodiment. FIG. 6 illustrates an example in which an unmanned aerial vehicle transmits and receives a signal over time. Here, $Y_1$ denotes an axis corresponding to a magnitude m of amplitude of a signal broadcasted from a transmitter of the unmanned aerial vehicle, and $Y_2$ denotes an axis corresponding to a magnitude m of amplitude of a signal received at a receiver of the unmanned aerial vehicle. The unmanned aerial vehicle may periodically broadcast a first notification signal BS1 in flight, based on a transmission interval $T_2$ (sec). In detail, the first notification signal BS1 may be a signal in which current location information of the unmanned aerial vehicle and a predicted route and predicted location information of the unmanned aerial vehicle corresponding to the transmission interval $T_2$ are encoded.

In flight, the unmanned aerial vehicle may receive a second notification signal BS2 from another unmanned aerial vehicle. For example, the first notification signal BS1 and the second notification signal BS2 may have the same signal length (sec) of $T_1$ based on a promise made between the unmanned aerial vehicles. The second notification signal BS2 may be a signal in which current location information of the other unmanned aerial vehicle and a predicted route and predicted location information of the other unmanned aerial vehicle corresponding to a transmission interval $T_2$ are encoded.

In this case, the unmanned aerial vehicle may transmit a third notification signal BS3 to the other unmanned aerial vehicle as a response signal to the second notification signal BS2. In detail, the third notification signal BS3 may be an acknowledgement (ACK) signal to the second notification signal BS2. Further, the third notification signal BS3 may have a signal length $T_3$ different from that of the first notification signal BS1 and the second notification signal BS2.

Once the unmanned aerial vehicle determines to be in an emergency state in flight, the unmanned aerial vehicle may stop periodically transmitting the first notification signal BS1 and may transmit a first danger signal ES1. For example, the first danger signal ES1 may have a time length $T_4$ different from that of the first notification signal BS1. The first danger signal ES1 may be a signal used to inform a neighboring flying object about the emergency state of the unmanned aerial vehicle and to inform a ground control center or a control device of preparing probable crash of the unmanned aerial vehicle.

Figure 7:
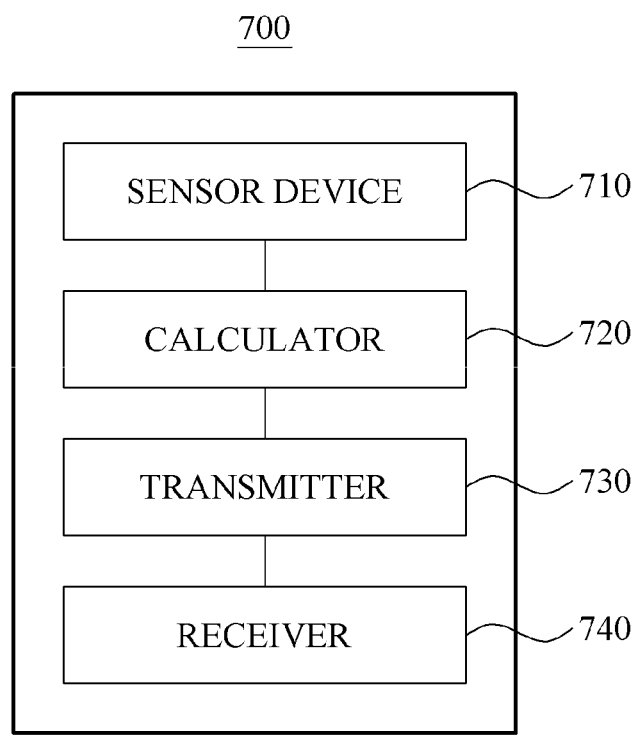
FIG. 7 is a block diagram illustrating another example of an unmanned aerial vehicle according to an example embodiment.

FIG. 7 is a block diagram illustrating another example of an unmanned aerial vehicle according to an example embodiment. Referring to FIG. 7, an unmanned aerial vehicle 700 may include a sensor device 710, a calculator 720, a transmitter 730, and a receiver 740. The sensor device 710 may measure first sensing data corresponding to a heading direction of the unmanned aerial vehicle 700. In detail, the sensor device 710 may measure, as the first sensing data, first acceleration data and first angular speed data on a plane corresponding to the heading direction of the unmanned aerial vehicle 700 and second acceleration data and second angular speed data of a vertical direction of the plane. The sensor device 710 may acquire 3D travel data corresponding to a current location of the unmanned aerial vehicle 700.

In addition, the sensor device 710 may include a vision sensor that includes at least one form of a charged coupled device (CCD) camera, an infrared ray (IR) camera, and a thermal imaging camera. The unmanned aerial vehicle 700 may predict a sudden crash, a collision with a building or a terrestrial object using the vision sensor.

The calculator 720 may calculate a predicted route and first predicted location information of the unmanned aerial vehicle 700 corresponding to a preset period of time based on first current location information and first sensing data.

The transmitter 730 may calculate a difference value between second current location information after the preset period of time and the first predicted location information, and may periodically broadcast a first danger signal if the difference value is greater than or equal to a threshold. Neighboring other unmanned aerial vehicles may receive the first danger signal and thereby may change flight paths. In this manner, it is possible to prevent a collision with the unmanned aerial vehicle 700.

Further, if the first predicted location information deviates from a preset altitude range, the transmitter 730 may periodically broadcast the first danger signal. A control center, a user terminal, or a control device associated with the unmanned aerial vehicle 700 may verify current GPS information of the unmanned aerial vehicle 700 in response to the first danger signal, and may prepare a negligent accident by a probable crash of the unmanned aerial vehicle 700.

The receiver 740 may receive a second danger signal associated with another unmanned aerial vehicle from the other unmanned aerial vehicle. In addition, the transmitter 730 may transmit a first notification signal for requesting a route and a second predicted location corresponding to a preset period of time to the other unmanned aerial vehicle. In response to the receiver 740 receiving a response signal corresponding to the first notification signal, the unmanned aerial vehicle 700 may change at least one of an air speed, a flying altitude, and a heading direction of the unmanned aerial vehicle 700 based on second predicted location information included in the response signal.

The units and/or modules described herein may be implemented using hardware components, software components, and/or combination thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An unmanned aerial vehicle comprising:
a calculator configured to calculate a first predicted route and second location information of the unmanned aerial vehicle corresponding to a preset period of time based on first location information and sensing data, said sensing data including acceleration data and speed data corresponding to a heading direction of the unmanned aerial vehicle;
a transmitter configured to periodically broadcast a first notification signal that includes the first location information, the first predicted route, and the second location information; and
a receiver configured to receive a second notification signal that includes a second predicted route and third location information associated with another unmanned aerial vehicle from the another unmanned aerial vehicle;
wherein the calculator is further configured to calculate a collision probability between the unmanned aerial vehicle and the another unmanned aerial vehicle based on the sensing data, the second location information, and the third location information; and
further comprising a controller configured to change the predicted route of the unmanned aerial vehicle in response to the collision probability calculated at the calculator being greater than or equal to a threshold.

2. The unmanned aerial vehicle of claim 1, wherein the transmitter is further configured to periodically broadcast the first notification signal that further includes a message requesting a second predicted route of the another unmanned aerial vehicle.

3. The unmanned aerial vehicle of claim 1, wherein the calculator is further configured to use, as the sensing data, first acceleration data and first angular speed data on a plane corresponding to the heading direction of the unmanned aerial vehicle and second acceleration data and second angular speed data of a vertical direction of the plane.

4. An unmanned aerial vehicle comprising:
a sensor device configured to measure first sensing data, said first sensing data including acceleration data and speed data corresponding to a heading direction of the unmanned aerial vehicle;
a calculator configured to calculate a predicted route and first predicted location information of the unmanned aerial vehicle corresponding to a preset period of time based on first current location information and the first sensing data;
a transmitter configured to periodically broadcast a first danger signal in response to a difference value, between second current location information after the preset period of time and the first predicted location information, being greater than or equal to a threshold;
a receiver configured to receive a second danger signal associated with another unmanned aerial vehicle from the another unmanned aerial vehicle;
wherein the calculator is further configured to calculate a collision probability between the unmanned aerial vehicle and the another unmanned aerial vehicle based on the sensing data, the second current location information, and third location information associated with the another unmanned aerial vehicle received from the another unmanned aerial vehicle; and
further comprising a controller configured to change the predicted route of the unmanned aerial vehicle in response to the collision probability calculated at the calculator being greater than or equal to a threshold.

5. The unmanned aerial vehicle of claim 4, wherein the sensor device is further configured to measure first acceleration data and first angular speed data on a plane corresponding to the heading direction of the unmanned aerial vehicle and second acceleration data and second angular speed data of a vertical direction of the plane.

6. The unmanned aerial vehicle of claim 4, wherein the transmitter is further configured to periodically broadcast the first danger signal in response to the first predicted location information being outside preset altitude coverage.

7. The unmanned aerial vehicle of claim 4, further wherein the transmitter is further configured to transmit a first notification signal for requesting a route and second predicted location information corresponding to the preset period of time to the another unmanned aerial vehicle.

8. The unmanned aerial vehicle of claim 7, further comprising:
a controller configured to change the predicted route of the unmanned aerial vehicle based on the second predicted location information included in a response signal, in response to the receiver receiving the response signal corresponding to the first notification signal.

9. A non-transitory computer-readable recording medium storing a program to periodically transmit a notification signal that includes a predicted route and location information of an unmanned aerial vehicle, wherein the program comprises:
a set of instructions configured to calculate the predicted route and second location information corresponding to a preset period of time based on first location information and sensing data, the sensing data including acceleration data and speed data corresponding to a heading direction of the unmanned aerial vehicle;
a set of instructions configured to periodically broadcast a first notification signal that includes the first location information, the predicted route, and the second location information;
a set of instructions configured to calculate a collision probability between the unmanned aerial vehicle and another unmanned aerial vehicle based on the sensing data, the second location information, and third location information associated with the another unmanned aerial vehicle received from the another unmanned aerial vehicle; and
a set of instructions configured to change the predicted route of the unmanned aerial vehicle in response to the collision probability calculated being greater than or equal to a threshold.

10. A non-transitory computer-readable recording medium storing a program run on an unmanned aerial vehicle to determine an emergency state of the unmanned aerial vehicle and to periodically transmit a danger signal from the unmanned aerial vehicle associated with the emergency state, wherein the program comprises:
a set of instructions configured to measure first sensing data, the first sensing data including acceleration data and speed data corresponding to a heading direction of the unmanned aerial vehicle;
a set of instructions configured to calculate a predicted route and first predicted location information of the unmanned aerial vehicle corresponding to a preset period of time based on first current location information and the first sensing data;
a set of instructions configured to calculate a difference value between second current location information after the preset period of time and the first predicted location information, and to periodically broadcast from the unmanned aerial vehicle a first danger signal in response to the difference value being greater than or equal to a threshold;
a set of instructions configured to calculate a collision probability between the unmanned aerial vehicle and another unmanned aerial vehicle based on the sensing data, the second location information, and third location information associated with the another unmanned aerial vehicle received from the another unmanned aerial vehicle; and
a set of instructions configured to change the predicted route of the unmanned aerial vehicle in response to the collision probability calculated being greater than or equal to a threshold.

11. An unmanned aerial vehicle comprising:
a sensor device configured to measure sensing data, said sensing data including acceleration data and speed data corresponding to a heading direction of the unmanned aerial vehicle;
a receiver configured to receive a transmitted signal from a nearby aerial vehicle that includes first location information of the nearby aerial vehicle, and configured to receive a broadcasting signal that includes third location information from the nearby aerial vehicle;
a calculator configured to calculate a predicted route and second location information of the unmanned aerial vehicle during a predetermined time and to calculate a probability of collision with the nearby aerial vehicle based on the sensing data, the second location information and the third location information received from the nearby aerial vehicle; and
further comprising a controller configured to change the predicted route of the unmanned aerial vehicle in response to the collision probability calculated at the calculator being greater than or equal to a threshold.

12. The unmanned aerial vehicle of claim 11, further comprising:
a transmitter configured to periodically broadcast a notification signal that includes the second location information and the predicted route.

13. The unmanned aerial vehicle of claim 11, further comprising:
a transmitter configured to transmit a notification signal that includes the second location information and the predicted route to the nearby aerial vehicle.

14. The unmanned aerial vehicle of claim 11, wherein the sensor device is configured to measure sensing data corresponding to the heading direction of the unmanned aerial vehicle.

* * * * *